US012811314B2

(12) United States Patent
(10) Patent No.: US 12,811,314 B2
(45) Date of Patent: Nov. 24, 2026

Wu et al.

(54) CROSS-DIPOLE RADIATING ELEMENTS HAVING HELIX-SHAPED DIPOLE ARMS AND BASE STATION ANTENNAS HAVING SUCH RADIATING ELEMENTS

(71) Applicant: Outdoor Wireless Networks LLC, Claremont, NC (US)

(72) Inventors: Bo Wu, Allen, TX (US); Peter J. Bisiules, LaGrange Park, IL (US); Chengcheng Tang, Richardson, TX (US)

(73) Assignee: Outdoor Wireless Networks LLC, Richardson, TX (US)

( * ) Notice: Subject to any disclaimer, the term of this patent is extended or adjusted under 35 U.S.C. 154(b) by 370 days.

(21) Appl. No.: 18/533,371

(22) Filed: Dec. 8, 2023

(65) Prior Publication Data

US 2024/0195081 A1 Jun. 13, 2024

Related U.S. Application Data

(60) Provisional application No. 63/431,426, filed on Dec. 9, 2022.

(51) Int. Cl.

| | |
|---|---|
| ***H01Q 21/26*** | (2006.01) |
| ***H01Q 1/24*** | (2006.01) |
| ***H01Q 5/42*** | (2015.01) |
| ***H01Q 5/48*** | (2015.01) |
| ***H01Q 9/28*** | (2006.01) |

(Continued)

(52) U.S. Cl.

CPC ............. *H01Q 21/26* (2013.01); *H01Q 1/246* (2013.01); *H01Q 5/42* (2015.01); *H01Q 5/48* (2015.01); *H01Q 9/285* (2013.01); *H01Q 19/108* (2013.01); *H01Q 21/062* (2013.01)

(58) Field of Classification Search

CPC ........... H01Q 1/14; H01Q 1/246; H01Q 1/36; H01Q 5/40; H01Q 5/42; H01Q 5/48; H01Q 5/49; H01Q 9/16; H01Q 9/28; H01Q 19/108; H01Q 21/062; H01Q 21/21;

(Continued)

(56) References Cited

U.S. PATENT DOCUMENTS

| | | | |
|---|---|---|---|
| 10,439,285 | B2 | 10/2019 | Isik et al. |
| 10,770,803 | B2 | 9/2020 | Varnoosfaderani et al. |

(Continued)

FOREIGN PATENT DOCUMENTS

| | | | |
|---|---|---|---|
| CN | 111555030 | A | 8/2020 |
| CN | 112164869 | A | 1/2021 |

(Continued)

*Primary Examiner* — Robert Karacsony

(74) *Attorney, Agent, or Firm* — Myers Bigel, P.A.

(57) ABSTRACT

A base station antenna includes first and second RF ports, a first array of radiating elements that are configured to transmit and receive RF signals in a first operating frequency band, where each of the radiating elements in the first array is coupled to the first RF port, and a second array of radiating elements that are configured to transmit and receive RF signals in a second (higher) operating frequency band, where each of the radiating elements in the second array is coupled to the second RF port. A first of the radiating elements in the first array includes a first dipole radiator that has a center-fed first dipole arm that comprises a first conductor, where at least a first portion of the first conductor has a helix-shape.

10 Claims, 9 Drawing Sheets

(51) Int. Cl.
*H01Q 19/10* (2006.01)
*H01Q 21/06* (2006.01)

(58) Field of Classification Search
CPC ...... H01Q 21/26; H01Q 25/00; H01Q 25/001; H01Q 25/002
See application file for complete search history.

(56) References Cited

U.S. PATENT DOCUMENTS

| | | | | |
|---|---|---|---|---|
| 11,018,437 | B2 | 5/2021 | Tang et al. | |
| 2017/0373385 | A1* | 12/2017 | Alu | H01Q 15/0086 |
| 2023/0163468 | A1* | 5/2023 | Semilovsky | H01Q 1/246 343/702 |

FOREIGN PATENT DOCUMENTS

| | | | |
|---|---|---|---|
| CN | 112186333 | A | 1/2021 |
| CN | 112186341 | A | 1/2021 |
| CN | 112290199 | A | 1/2021 |
| CN | 112421219 | A | 2/2021 |
| CN | 112768895 | A | 5/2021 |
| CN | 112787061 | A | 5/2021 |
| CN | 112821044 | A | 5/2021 |
| CN | 213304351 | U | 5/2021 |
| WO | 2021042862 | A1 | 3/2021 |

* cited by examiner

CROSS-DIPOLE RADIATING ELEMENTS HAVING HELIX-SHAPED DIPOLE ARMS AND BASE STATION ANTENNAS HAVING SUCH RADIATING ELEMENTS

CROSS-REFERENCE TO RELATED APPLICATION

The present application claims priority under 35 U.S.C. § 119 to U.S. Provisional Patent Application Ser. No. 63/431,426, filed Dec. 9, 2022, the entire content of which is incorporated herein by reference as if set forth in its entirety.

BACKGROUND

The present invention generally relates to radio communications and, more particularly, to base station antennas for cellular communications systems.

Cellular communications systems are well known in the art. In a cellular communications system, a geographic area is divided into a series of regions that are referred to as "cells" which are served by respective base stations. The base station may include one or more base station antennas that are configured to provide two-way radio frequency ("RF") communications with mobile subscribers that are within the cell served by the base station. Typically, the base station antennas are mounted on a tower or other raised structure, with the radiation patterns (also referred to herein as "antenna beams") that are generated by the base station antennas directed outwardly. In many cases, each base station is divided into "sectors." In one common configuration, a hexagonally shaped cell is divided into three 120° sectors in the azimuth plane, which is a horizontal plane (i.e., a plane that is parallel to the plane defined by the horizon) that bisects the base station antenna. Each sector is served by one or more base station antennas that generate antenna beams having azimuth Half Power Beamwidths ("HPBW") of approximately 65°, which provides good coverage throughout the 120° sector. Base station antennas that provide less than omnidirectional (360°) coverage in the azimuth plane are often referred to as "sector" base station antennas. The antenna beams formed by both omnidirectional and sector base station antennas are typically generated by linear or planar phased arrays of radiating elements that are included in the antenna.

In order to accommodate the increasing volume of cellular communications, cellular operators have added cellular service in a variety of new frequency bands. While in some cases it is possible to use a single array of so-called "wide-band" or "ultra-wide-band" radiating elements to provide service in multiple frequency bands, in other cases it is necessary to use different arrays of radiating elements to support service in the different frequency bands.

As the number of frequency bands has proliferated and increased sectorization has become more common (e.g., dividing a cell into six, nine or even twelve sectors), the number of base station antennas deployed at a typical base station has increased significantly. However, due to, for example, local zoning ordinances and/or weight and wind loading constraints for the antenna towers, there is often a limit as to the number of base station antennas that can be deployed at a given base station. In order to increase capacity without further increasing the number of base station antennas, so-called multi-band base station antennas have been introduced which include multiple arrays of radiating elements. Multi-band base station antennas are now being developed that include arrays that operate in three (or more) different frequency bands and often within multiple sub-bands in one or more of these frequency bands. For example, base station antennas are now being deployed that include two linear arrays of "low-band" radiating elements that operate in some or all of the 617-960 MHz frequency band, two linear arrays of "mid-band" radiating elements that operate in some or all of the 1427-2690 MHz frequency band and one or more multi-column (planar) arrays of "high-band" radiating elements that operate in some or all of a higher frequency band, such as the 3.3-4.2 GHz frequency band. Unfortunately, the different arrays can interact with each other, which may make it challenging to implement such multi-band antennas while also meeting customer requirements relating to the size (and particularly the width) of the base station antenna.

SUMMARY

Pursuant to embodiments of the present invention, base station antennas are provided that include first and second RF ports, a first array of radiating elements that are configured to transmit and receive RF signals in a first operating frequency band, where each of the radiating elements in the first array is coupled to the first RF port, and a second array of radiating elements that are configured to transmit and receive RF signals in a second operating frequency band, where each of the radiating elements in the second array is coupled to the second RF port. The second operating frequency band is at higher frequencies than the first operating frequency band. A first of the radiating elements in the first array includes a first dipole radiator that has a center-fed first dipole arm that comprises a first conductor, where at least a first portion of the first conductor has a helix-shape.

In some embodiments, the first portion of the first conductor comprises at least two resonant circuits that, together or in combination with additional resonant circuits, are configured to suppress formation of currents in the second operating frequency band on the first dipole arm.

In some embodiments, a diameter or electrical length of the first portion of the first conductor or a magnitude or spacing of turns of the helix defined by the first portion of the first conductor is selected to suppress formation of currents in the second operating frequency band on the first dipole arm on the first dipole arm.

In some embodiments, an electrical length of the first dipole arm is approximately one quarter of a wavelength that corresponds to a center frequency of the first operating frequency band.

In some embodiments, the first dipole arm further comprises a second conductor, wherein at least a first portion of the second conductor has a helix-shape, and wherein the first portions of the first and second conductors are wound around a common axis.

In some embodiments, the first conductor further includes a second portion that has a helix-shape.

In some embodiments, the first portion is collinear with the second portion and spaced apart from the second portion by a third portion of the first conductor that does not have a helix-shape.

In some embodiments, the first portion extends at an oblique angle with respect to the second portion.

In some embodiments, the first conductor forms a conductive loop.

In some embodiments, wherein the first portion of the first conductor and one or more additional portions of the first conductor that are part of the conductive loop each have a helix-shape.

In some embodiments, each of the radiating elements in the first array comprises a cross-dipole radiating element, and wherein each dipole arm of each of the radiating elements in the first array comprises a respective conductor where at least a portion of each conductor has a helix-shape.

In some embodiments, the first dipole radiator further includes a center-fed second dipole arm that comprises a second conductor, where at least a first portion of the second conductor has a helix-shape.

Pursuant to further embodiments of the invention cross-dipole radiating elements are provided that include a first dipole radiator that comprises a first dipole arm and a second dipole arm and a second dipole radiator that comprises a third dipole arm and a fourth dipole arm. The first through fourth dipole arms comprise respective first through fourth conductors, where each of the first through fourth conductors includes at least a first portion that has a helix-shape.

In some embodiments, the first dipole radiator is a center fed dipole radiator and the second dipole radiator is a center fed dipole radiator.

In some embodiments, each of the first through fourth dipole arms is configured to suppress formation of currents on the respective first through fourth dipole arms in a predetermined frequency range.

In some embodiments, an electrical length of each of the first through fourth dipole arms is approximately one quarter of a wavelength that corresponds to a center frequency of an operating frequency band of the cross-dipole radiating element.

In some embodiments, the first dipole arm further comprises a second conductor, and wherein the first portion of the first conductor and a first portion of the second conductor that has a helix-shape are wound around a common axis.

In some embodiments, each of the first through fourth conductors further includes a second portion that has a helix-shape.

In some embodiments, the first portion of each of the first through fourth conductors is collinear with the second portion of each of the respective first through fourth conductors and spaced apart from the respective second portion by a respective third portion of the first through fourth conductors that does not have a helix-shape.

In some embodiments, the first portion of each of the first through fourth conductors extends at an oblique angle with respect to the second portion of each of the respective first through fourth conductors.

In some embodiments, the first through fourth conductors each form a respective conductive loop.

In some embodiments, the first portion of the first conductor and one or more additional portions of the first conductor that are part of the conductive loop each have a helix-shape.

The above-described cross-dipole radiating elements may be part of a base station antenna that includes first and second RF ports, a first array of radiating elements that are configured to transmit and receive RF signals in a first operating frequency band, where each of the radiating elements in the first array is coupled to the first RF port, and a second array of radiating elements that are configured to transmit and receive RF signals in a second (higher) operating frequency band, where each of the radiating elements in the second array is coupled to the second RF port. In particular, at least some of the radiating elements in the first array may be formed using the above-described cross-dipole radiating elements Pursuant to additional embodiments of the present invention, base station antennas are provided that include first and second RF ports, a first array of radiating elements that are configured to transmit and receive RF signals in a first operating frequency band, where each of the radiating elements in the first array is coupled to the first RF port, and a second array of radiating elements that are configured to transmit and receive RF signals in a second operating frequency band, where each of the radiating elements in the second array is coupled to the second RF port. The second operating frequency band is at higher frequencies than the first operating frequency band. These base station antennas further a parasitic element that comprises a first conductor, where at least a first portion of the first conductor has a helix-shape.

In some embodiments, the parasitic element is configured to be substantially transparent to RF energy in the second operating frequency band.

In some embodiments, a diameter or electrical length of the first portion of the first conductor or a magnitude or spacing of turns of the helix defined by the first portion of the first conductor are selected to suppress formation of currents on the parasitic element in the second operating frequency band.

In some embodiments, at least some of the radiating elements in the first array of radiating elements and the parasitic element extend forwardly from a reflector of the base station antenna.

Pursuant to still further embodiments of the present invention, base station antennas are provided that include a first radiating element that is configured to transmit and receive RF signals in a first operating frequency band, a second radiating element that is configured to transmit and receive RF signals in a second operating frequency band that is at higher frequencies than the first operating frequency band, the second radiating element mounted rearwardly of the first radiating element, and a coaxial feed cable that is coupled to the first radiating element, where at least a portion of the coaxial feed cable is arranged as a helix.

In some embodiments, the base station antenna may further include a frequency selective surface that is mounted in between the first radiating element and the second radiating element. In some embodiments, the coaxial feed cable extends along a front or rear surface of the frequency selective surface. In some embodiments, the coaxial feed cable is configured to be substantially transparent to RF energy in the second operating frequency band.

Pursuant to yet additional embodiments of the present invention, frequency selective surfaces are provided that comprise a plurality of conductors that are arranged to form a grid that has a plurality of unit cells. At least some of the conductors include helix-shaped portions.

In some embodiments, each unit cell comprises first through fourth conductor segments that define a square, wherein for each unit cell each conductor segment is a portion of a different one of the plurality of conductors.

In some embodiments, at least a portion of each of the first through fourth conductor segments of at least some of the unit cells has a helix-shape.

DETAILED DESCRIPTION

Figure 1:
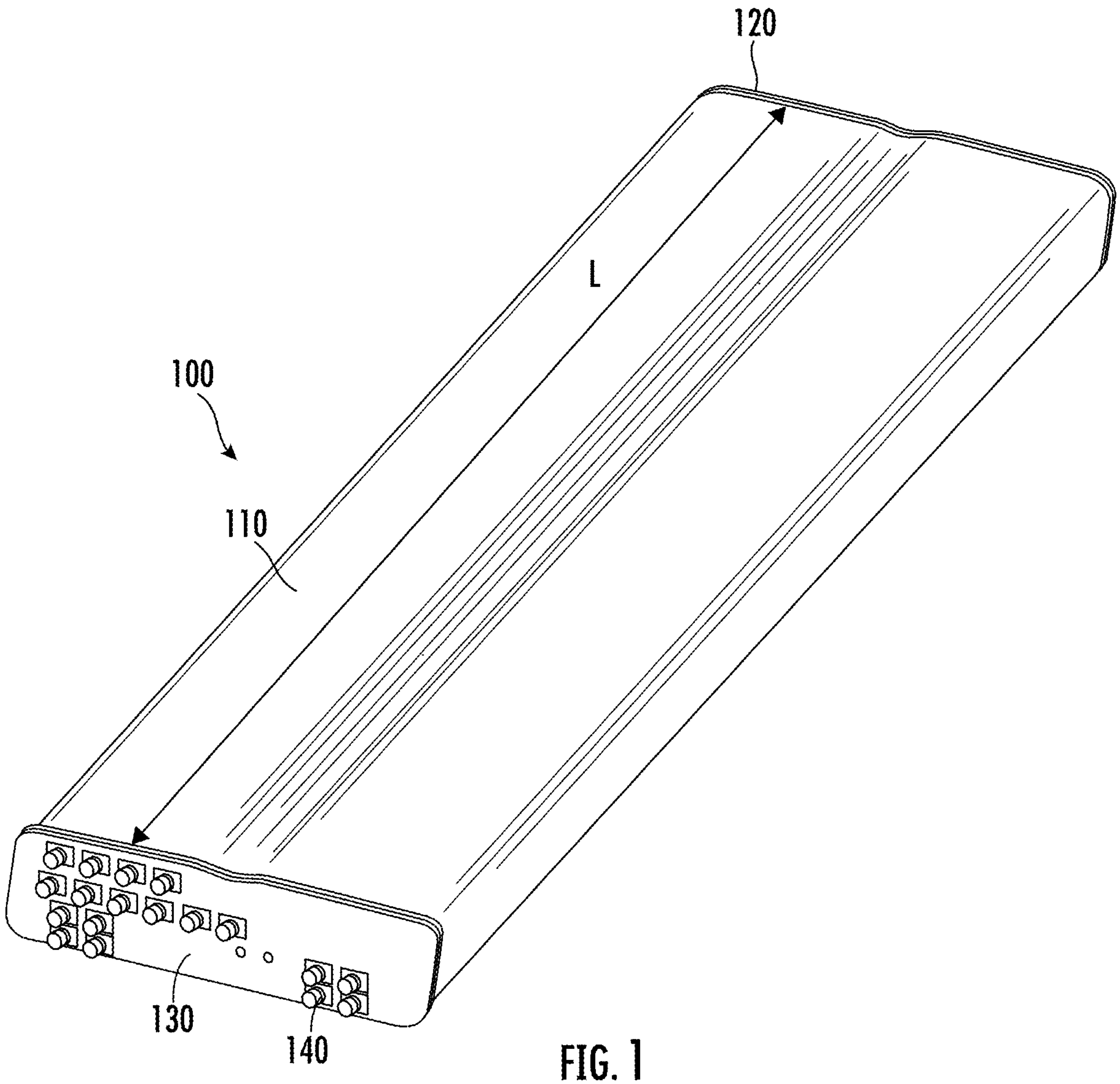
FIG. 1 is a perspective view of a base station antenna according to embodiments of the present invention.

Embodiments of the present invention relate generally to radiating elements for multi-band base station antennas and to related base station antennas. The base station antennas that include radiating elements according to embodiments of the present invention may be used, for example, as sector antennas in the above-described cellular communications systems. The multi-band base station antennas according to embodiments of the present invention may support multiple major air-interface standards in two or more cellular frequency bands and allow wireless operators to reduce the number of antennas deployed at base stations, lowering tower leasing costs.

A challenge in the design of multi-band base station antennas is reducing the effect of scattering of the RF signals at one frequency band by the radiating elements of other frequency bands. Scattering is undesirable as it may affect the shape of the antenna beam in both the azimuth and elevation planes, and the effects may vary significantly with frequency, which may make it hard to compensate for these effects. Moreover, at least in the azimuth plane, scattering tends to impact the beamwidth, beam shape, pointing angle, gain and front-to-back ratio of the antenna beams in undesirable ways. The radiating elements according to embodiments of the present invention are so-called "cloaking" radiating elements that have reduced impact on the antenna beams generated by closely located radiating elements that transmit and receive signals in other frequency bands (i.e., reduced scattering).

Cloaking radiating elements are known in the art. For example, U.S. Pat. No. 9,570,804 discloses a low-band radiating element that operates in the 696-960 MHz frequency band that includes dipole arms that are formed as a series of RF chokes in order to render the low-band radiating element substantially transparent to RF energy in the 1.7-2.7 GHz frequency band. U.S. Pat. Nos. 10,439,285 and 10,770,803 each disclose radiating elements that operate in the 696-960 MHz frequency band that include dipole arms that are formed as a series of widened segments that are coupled by narrow inductive segments, which may be implemented as small, meandered trace segments on a printed circuit board. In each case, the narrow inductive segments act as high impedance elements for RF energy in the 1.7-2.7 GHz frequency band, rendering the low-band radiating elements substantially transparent to RF energy in that frequency range. As another example, U.S. Pat. No. 11,018,437 discloses a radiating element that operates in the 696-960 MHz frequency band that includes two dipole arms that are substantially transparent to RF energy in the 1.7-2.7 GHz frequency band and another two dipole arms that are substantially transparent to RF energy in the 3.3-4.2 GHZ frequency band. Additional cloaking radiating element designs are disclosed in Chinese Patent No. CN 112787061A, Chinese Patent No. CN 112164869A, Chinese Patent No. CN 112290199A, Chinese Patent No. CN 111555030A, Chinese Patent No. CN 112186333A, Chinese Patent No. CN 112186341A, Chinese Patent No. CN 112768895A, Chinese Patent No. CN 112821044A, Chinese Patent No. CN 213304351U, Chinese Patent No. CN 112421219A, and PCT Publication WO 2021/042862.

Pursuant to embodiments of the present invention, multi-band base station antennas are provided that include at least a first array of radiating elements and a second array of radiating elements that transmit and receive signals in respective first and second (different) operating frequency bands. In some embodiments, the multi-band base station antennas may further include a third array of radiating elements that transmits and receives signals in a third operating frequency band that differs from the first and second operating frequency bands. In some embodiments, the first operating frequency band may comprise the 617-960 MHz frequency band or a portion thereof, the second operating frequency band may comprise the 1427-2690 MHz frequency band or a portion thereof, and the third operating frequency band may comprise the 3100-4200 MHz frequency band or a portion thereof. In other embodiments, the first operating frequency band may comprise the 1427-2690 MHz frequency band or a portion thereof, the second operating frequency band may comprise the 3100-4200 MHZ frequency band or a portion thereof, and the third operating frequency band may comprise the 617-960 MHz frequency band or a portion thereof. Each radiating element in the first array may be a cloaking radiating element that has dipole radiators that are substantially transparent to RF energy in the second frequency band. In some embodiments, each radiating element in the first array may also be substantially transparent to RF energy in the third frequency band.

The radiating elements in the first array may have helix-shaped dipole arms or dipole arms that include helix-shaped portions or "sections." The equivalent circuit of a helix-shaped dipole arm is a series connection of multiple parallel inductor-capacitor ("L-C") resonant circuits. These resonant circuits can be designed to form a filter that blocks currents from forming on the dipole arm in response to RF energy emitted by nearby radiating elements that operate in higher frequency ranges. The capacitance and inductance of the L-C resonant circuits may be easily adjusted by selecting the diameter of the conductor that is used to form the helix-shaped dipole arm and the magnitude and spacing of the turns of the helix. Thus, a filter can readily be formed that is designed to block currents in the operating frequency ranges of nearby higher band radiating elements. Moreover, the helix-shaped dipole arms may be fabricated at very low cost from metal wires, thus providing a low-cost radiating element having good cloaking performance.

The cloaking radiating elements according to embodiments of the present invention may be cross-dipole radiating elements, such as −45°/+45° polarized cross-dipole radiating elements or horizontal/vertical polarized cross-dipole radiating elements. Each radiating element may include a pair of dipole radiators that radiate at orthogonal polarizations. Each dipole radiator may include a pair of center-fed dipole arms so that each radiating element includes a total of four dipole arms.

Pursuant to further aspects of the present invention, other elements of a base station antenna may be designed to have a helix-shape so that these elements will be substantially transparent to RF energy in a selected frequency band. For example, parasitic elements that are included in a base station antenna for purposes of shaping the antenna beams formed by a first array of radiating elements may be implemented as helix-shaped parasitic elements that will be substantially transparent to RF energy in an operating frequency band of a second array of radiating elements included in the base station antenna. In other embodiments, coaxial cables may be wound to have a helix-shape to make the coaxial cables more transparent to RF energy in an operating frequency band of an array of radiating elements included in the base station antenna. In still other embodiments, an open metal grid may be provided where the metal portions of the grid are implemented using helically-wound wires to create a frequency selective surface that is substantially transparent to RF energy in a first frequency band while being substantially reflective to RF energy in a second frequency band.

In some embodiments, base station antennas are provided that include a first array of radiating elements that are configured to transmit and receive RF signals in a first operating frequency band, where each of the radiating elements in the first array is coupled to a first RF port, and a second array of radiating elements that are configured to transmit and receive RF signals in a second operating frequency band, where each of the radiating elements in the second array is coupled to the second RF port. The second operating frequency band is at higher frequencies than the first operating frequency band. In these antennas, a first of the radiating elements in the first array includes a first dipole radiator that has a center-fed first dipole arm that comprises a first conductor, where at least a first portion of the first conductor has a helix-shape.

In some embodiments, the first portion of the first conductor may comprise at least two resonant circuits that, together or in combination with additional resonant circuits, are configured to suppress formation of currents on the first dipole arm in a predetermined frequency range. For example, one or more of a diameter and electrical length of the first portion of the first conductor and/or a magnitude and spacing of turns of the helix defined by the first portion of the first conductor may be selected to suppress formation of currents on the first dipole arm in the predetermined frequency range.

In some embodiments, each dipole arm of the radiating elements in the first array may comprise a conductive wire that is wound to form a single helix. In other embodiments, each dipole arm of the radiating elements in the first array may comprise two or more conductive wires that are each wound to form a helix about a common axis so that the dipole arm may comprise, for example, a double-helix or a triple-helix dipole arm. The dipole arms may be center-fed dipole arms.

In some embodiments, the dipole arms of the radiating elements in the first array may comprise a conductor that has more than two helix-shaped portions. For example, in some cases the dipole arms may comprise a conductor that extends about an axis where the conductor has helix-shaped portions that are separated by non-helix-shaped portions (e.g., straight portions may separate the helix-shaped portions). In other embodiments, the conductor that comprises the dipole arm may only (or substantially) have portions that have a helix-shape, but the portions may extend at oblique angles with respect to each other to, for example, form a conductive loop.

Pursuant to further embodiments of the present invention, cross-dipole radiating elements are provided that comprise a first dipole radiator that comprises a first dipole arm and a second dipole arm, and a second dipole radiator that comprises a third dipole arm and a fourth dipole arm. The first through fourth dipole arms comprise respective first through fourth conductors, where each of the first through fourth conductors includes at least a first portion that has a helix-shape.

In some embodiments, the first and second dipole radiators are center fed dipole radiators. Each of the first through fourth dipole arms may be configured to suppress formation of currents thereon in a predetermined frequency range. An electrical length of each of the first through fourth dipole arms may be approximately one quarter of a wavelength that corresponds to a center frequency of an operating frequency band of the cross-dipole radiating element. In some embodiments, the first dipole arm may further comprise a second conductor that has a helix-shape, and the first and second conductors may be wound around a common axis.

Each of the first through fourth conductors may further include a second portion that has a helix-shape. In some embodiments, the first portion of each of the first through fourth conductors may be collinear with the second portion of each of the respective first through fourth conductor and separated therefrom by a non-helix-shaped portion. In other embodiments, the first portion of each of the first through fourth conductors may extend at an oblique angle with respect to the second portion of each of the respective first through fourth conductors. In some embodiments, the first through fourth conductors may each form a respective conductive loop.

Pursuant to further aspects of the present invention, base station antennas are provided that comprise first and second RF ports, a first array of radiating elements that are configured to transmit and receive RF signals in a first operating frequency band, where each of the radiating elements in the first array is coupled to the first RF port, a second array of radiating elements that are configured to transmit and receive RF signals in a second operating frequency band, where each of the radiating elements in the second array is coupled to the second RF port, and the second operating frequency band is at higher frequencies than the first operating frequency band, and a parasitic element that comprises a conductor that has a first portion that has a helix-shape.

In some embodiments, the parasitic element may be configured to be substantially transparent to RF energy in a predetermined frequency range. In some embodiments, a frequency, magnitude and/or electrical length of the helix is selected to suppress formation of currents on the first dipole arm in a predetermined frequency range. In some embodiments, at least some of the radiating elements in the first array of radiating elements and the parasitic element extend forwardly from a reflector of the base station antenna.

Pursuant to still further aspects of the present invention, base station antennas are provided that comprise a first radiating element that is configured to transmit and receive RF signals in a first operating frequency band, a second radiating element that is configured to transmit and receive RF signals in a second operating frequency band, that is at higher frequencies than the first operating frequency band, the second radiating element mounted rearwardly of the first radiating element, and a coaxial feed cable that is coupled to the first radiating element, where at least a portion of the coaxial feed cable has a helix-shape.

In some embodiments, the base station antenna may further include a frequency selective surface that is mounted in between the first radiating element and the second radiating element. In some embodiments, the coaxial feed cable extends along a front or rear surface of the frequency selective surface. In some embodiments, the coaxial feed cable is configured to be substantially transparent to RF energy in the second operating frequency band.

Pursuant to still further embodiments of the present invention, frequency selective surfaces are provided that include a plurality of conductors that are arranged to form a grid that has a plurality of unit cells. At least some of the conductors include helix-shaped portions. In some embodiments, each unit cell comprises first through fourth conductor segments that define a square, wherein for each unit cell each conductor segment is a portion of a different one of the plurality of conductors. In some embodiments, at least a portion of each of the first through fourth conductor segments of at least some of the unit cells has a helix-shape.

Embodiments of the present invention will now be described in further detail with reference to the attached figures.

Figure 2:
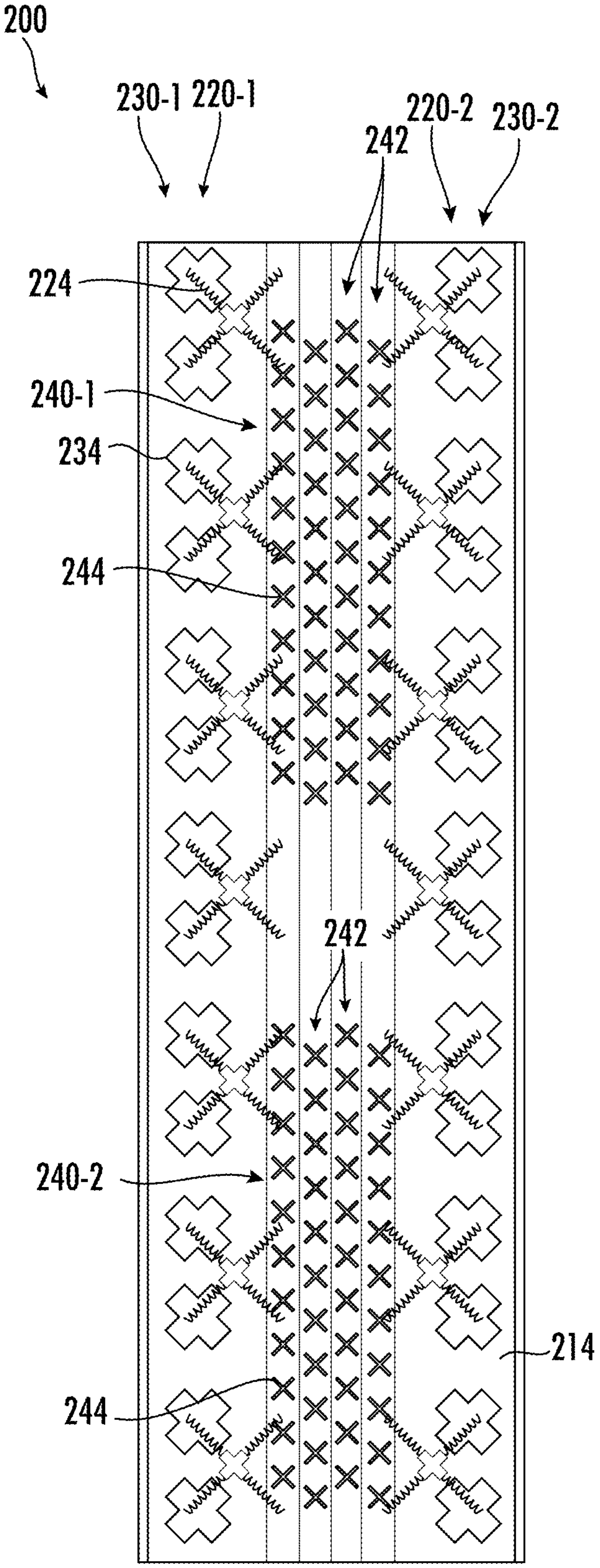
FIG. 2 is a front view of the base station antenna of FIG. 1 with the radome removed.
Figure 3:
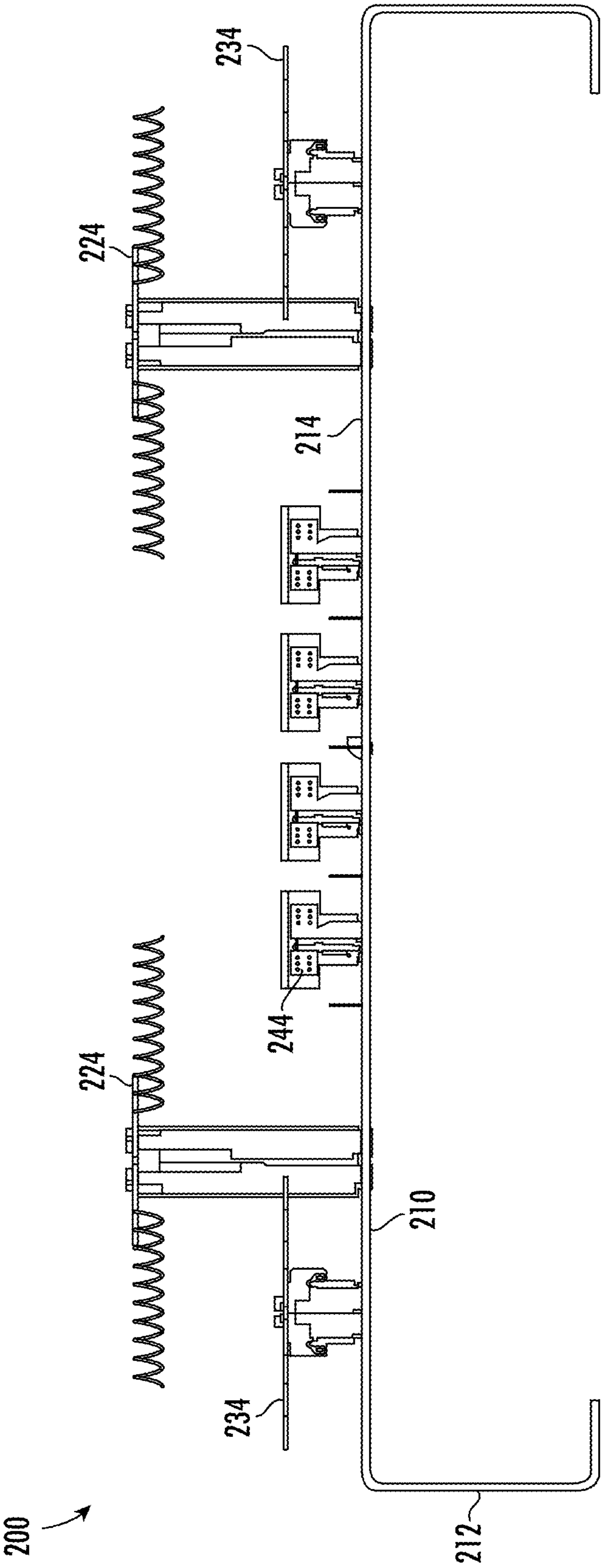
FIG. 3 is a cross-sectional view of the base station antenna of FIG. 1 with the radome removed.

FIGS. 1-3 illustrate a base station antenna 100 according to certain embodiments of the present invention. In particular, FIG. 1 is a perspective view of the antenna 100, while FIGS. 2 and 3 are a schematic front view and a schematic cross-sectional view, respectively, of the antenna 100 with the radome thereof removed to illustrate an antenna assembly 200 of the antenna 100. In the description that follows, the antenna 100 and the radiating elements included therein will be described using terms that assume that the antenna 100 is mounted for normal use on a tower with a longitudinal axis of the antenna 100 extending along a vertical axis and the front surface of the antenna 100 mounted opposite the tower pointing toward the coverage area for the antenna 100.

As shown in FIGS. 1-3, the base station antenna 100 is an elongated structure that extends along a longitudinal axis L. The base station antenna 100 may have a tubular shape with a generally rectangular cross-section. The antenna 100 includes a radome 110 and a top end cap 120. The antenna 100 also includes a bottom end cap 130 which includes a plurality of connectors 140 such as RF ports mounted therein. The antenna 100 is typically mounted in a vertical configuration (i.e., the longitudinal axis L may be generally perpendicular to a plane defined by the horizon) when the antenna 100 is mounted for normal operation. The radome 110, top cap 120 and bottom cap 130 may form an external housing for the antenna 100. An antenna assembly 200 is contained within the external housing. The antenna assembly 200 may be slidably inserted into the radome 110 from either the top or bottom before the top cap 120 or bottom cap 130 are attached to the radome 110.

FIGS. 2 and 3 are a front view and a cross-sectional view, respectively, of the antenna assembly 200 of base station antenna 100. As shown in FIGS. 2 and 3, the antenna assembly 200 includes a ground plane structure 210 that has sidewalls 212 and a reflector surface 214. Various mechanical and electronic components of the antenna (not shown) may be mounted in a chamber that is defined between the sidewalls 212 and the back side of the reflector surface 214 such as, for example, phase shifters, remote electronic tilt units, mechanical linkages, controllers, diplexers, and the like. The reflector surface 214 of the ground plane structure 210 may comprise or include a metallic surface (e.g., a sheet of aluminium) that serves as a reflector and ground plane for the radiating elements of the antenna 100. Herein the reflector surface 214 may also be referred to as the reflector 214.

A plurality of dual-polarized radiating elements are mounted to extend forwardly from the reflector 214. The radiating elements include low-band radiating elements 224, mid-band radiating elements 234 and high-band radiating elements 244. The low-band radiating elements 224 are mounted in two vertically-extending columns to form two linear arrays 220-1, 220-2 of low-band radiating elements 224. The mid-band radiating elements 234 may likewise be mounted in two vertically-extending columns to form two linear arrays 230-1, 230-2 of mid-band radiating elements 234. Two planar arrays 240-1, 240-2 of high-band radiating elements 244 are included in antenna 100. Each planar array 240 includes four vertically-extending columns 242 of high-band radiating elements 244. Each high-band array 240 may be connected to a respective beamforming radio (not shown) so that each planar array 240 may perform active beamforming to generate higher gain antenna beams. Herein, the linear arrays 220-1, 220-2 of low-band radiating elements 224 may also be referred to as the low-band linear arrays 220-1, 220-2, the linear arrays 230-1, 230-2 of mid-band radiating elements 234 may also be referred to as the mid-band linear arrays 230-1, 230-2, and the planar arrays 240 of high-band radiating elements 244 may also be referred to as the high-band arrays 240-1, 240-2. The azimuth half power beamwidths of each radiating element 224, 234, 244 may be in the range of 55° to 85°. In some embodiments, the azimuth half power beamwidth of each radiating element 224, 234, 244 may be approximately 65° in the center of the operating frequency band for the respective radiating element 224, 234, 244.

It will be appreciated that the number of arrays of low-band, mid-band and/or high-band radiating elements may be varied from what is shown in FIGS. 2 and 3, as may the number of columns and/or radiating elements in each array, and the relative positions of the arrays. It should be noted that herein like elements may be referred to individually by their full reference numeral (e.g., linear array 230-2) and may be referred to collectively by the first part of their reference numeral (e.g., the linear arrays 230).

In the depicted embodiment, the first and second planar arrays 240-1, 240-2 of high-band radiating elements 244 are positioned between the linear arrays 220-1, 220-2 of low-band radiating elements 224, and each linear array 220 of low-band radiating elements 224 is positioned between the planar arrays 240 of high-band radiating elements 244 and a respective one of the linear arrays 230 of mid-band radiating elements 234. It will be appreciated that antenna 100 illustrates one typical layout of arrays of low-band, mid-band and high-band radiating elements. Many other array configurations are routinely used based on applications and customer requirements. For example, one or both of the planar arrays 240 of high-band radiating elements 244 may be omitted in another example embodiment or replaced with two additional mid-band linear arrays 230. The radiating elements according to embodiments of the invention may be used in arrays having any suitable configuration.

The low-band radiating elements 224 may be configured to transmit and receive signals in a first frequency band such as, for example, the 617-960 MHz frequency range or a portion thereof (e.g., the 617-896 MHz frequency band, the 696-960 MHz frequency band, etc.). The mid-band radiating elements 234 may be configured to transmit and receive signals in a second frequency band such as, for example, the 1427-2690 MHz frequency range or a portion thereof (e.g., the 1710-2200 MHz frequency band, the 2300-2690 MHz frequency band, etc.). The high-band radiating elements 244 may be configured to transmit and receive signals in a third frequency band such as, for example, the 3300-4200 MHz frequency range or a portion thereof. The radiating elements 224, 234, 244 may be dual polarized radiating elements (e.g., −45°/+45° cross-dipole radiating elements), and hence each array 220, 230, 240 may be used to form a pair of antenna beams, namely an antenna beam for each of the two polarizations at which the dual-polarized radiating elements are designed to transmit and receive RF signals.

While not shown in the figures, the radiating elements 224, 234, 244 may be mounted on feed boards that couple RF signals to and from the individual radiating elements 224, 234, 244. One or more radiating elements 224, 234, 244 may be mounted on each feed board. Cables may be used to connect each feed board to other components of the antenna such as diplexers, phase shifters or the like.

While cellular network operators are interested in deploying antennas that have a large number of arrays of radiating elements in order to reduce the number of base station antennas required per base station, increasing the number of arrays typically increases the width of the antenna. Both the weight and wind loading of a base station antenna increase with increasing width, and thus wider base station antennas tend to require structurally more robust antenna mounts and antenna towers, both of which can significantly increase the cost of a base station. Accordingly, cellular network operators may place limitations on the widths of base station antennas (where the limits may depend on the application for the antenna).

The width of a multi-band base station antenna may be reduced by decreasing the separation between adjacent arrays. However, as the separation is reduced, increased interaction between the radiating elements of the different arrays occurs, and this increased interaction may impact the shapes of the antenna beams generated by the arrays in undesirable ways. For example, a low-band cross-dipole radiating element will typically have dipole radiators that each have a length that is approximately ½ a wavelength of the center frequency of the designed operating frequency band for the radiating element. Each dipole radiator typically comprises a pair of center-fed dipole arms that each have a length that is approximately ¼ a wavelength of the center frequency of the designed operating frequency band for the radiating element. Notably, many of the frequencies in the low-band operating frequency range are about one-half corresponding frequencies in the mid-band operating frequency range. Since the dipole radiators of the low-band radiating elements typically have a length that is about ½ a wavelength corresponding to the center frequency of the low-band operating frequency range, the low-band dipole radiators will have a length that is approximately one wavelength at frequencies within the mid-band operating frequency range. As a result, each dipole arm of a low-band dipole radiator will have a length that is approximately ½ a wavelength of frequencies within the mid-band operating frequency range, and hence RF energy transmitted by the mid-band radiating elements will tend to couple to the dipole arms of the low-band radiating elements since such RF energy will be resonant in a ½ wavelength dipole arm.

When mid-band and/or high-band RF energy couples to the dipole arms of a low-band radiating element, respective mid-band and/or high-band currents are induced on the dipole arms. Such induced currents are particularly likely to occur when the low-band and mid-band radiating elements are designed to operate in frequency bands having center frequencies that are separated by about a factor of two (or four), since a low-band dipole arm having a length that is a quarter wavelength of the low-band operating frequency will, in that case, have a length of approximately a half wavelength (or a full wavelength) of the higher band operating frequency. The induced currents generate mid-band (and/or high-band) RF radiation that is emitted from the low-band dipole arms. The mid-band/high-band RF energy emitted from the dipole arms of the low-band radiating element distorts the antenna beam of the mid-band and/or high-band arrays since the radiation is being emitted from a different location than intended. The greater the extent that mid-band/high-band currents are induced on the low-band dipole arms, the greater the impact on the characteristics of the antenna beams generated by the mid-band and high-band arrays.

The low-band radiating elements 224 according to embodiments of the present invention may be designed to be substantially transparent to RF energy emitted by the mid-band and/or high-band radiating elements 234, 244. As such, even if the mid-band and/or high-band radiating elements 234, 244 are in close proximity to the low-band radiating elements 224, the above-discussed undesired coupling of mid-band and/or high-band RF energy onto the low-band radiating elements 224 may be significantly reduced.

Figure 4A:
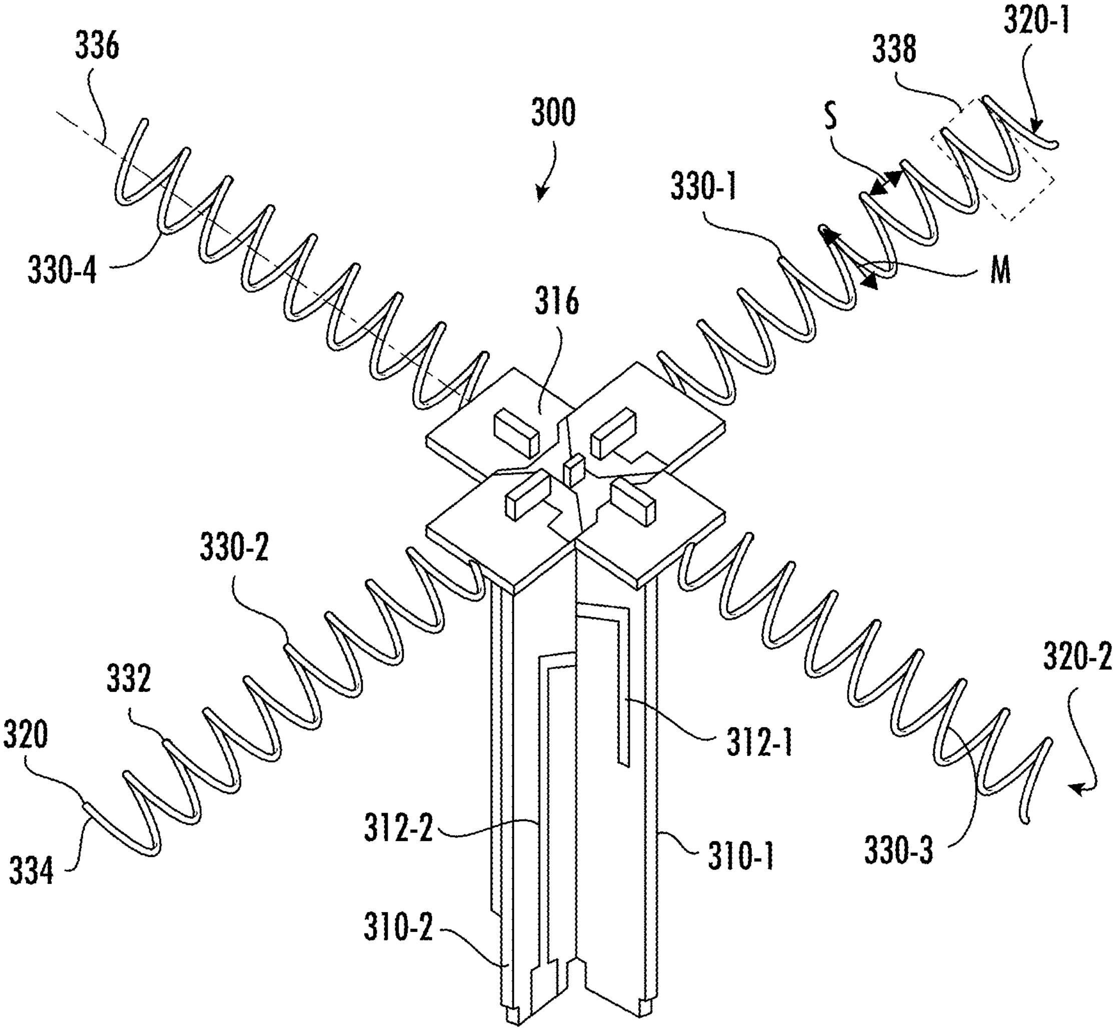
FIG. 4A is a schematic perspective view of one of the low-band radiating elements of the base station antenna of FIGS. 1-3.
Figure 4B:
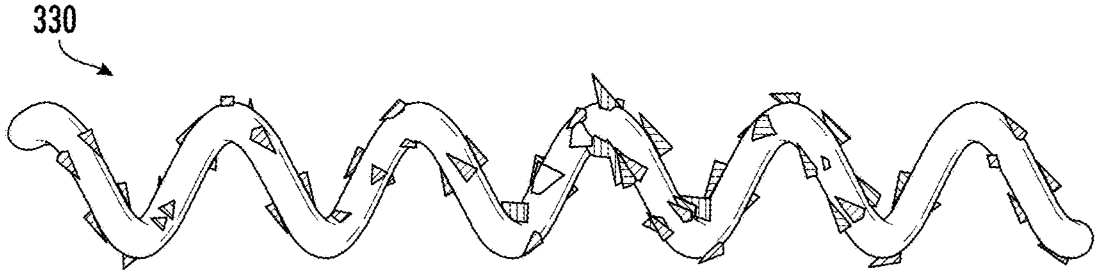
FIG. 4B is a schematic side view of one of the dipole arms of the low-band radiating element of FIG. 4A that illustrates current flow on the dipole arm.

FIGS. 4A and 4B illustrate a low-band radiating element 300 according to embodiments of the present invention that may be used to implement the low-band radiating elements 224 of base station antenna 100. In particular, FIG. 4A is a perspective view of the low-band radiating element 300, and FIG. 4B is a side view of a portion of one of the dipole arms of the low-band radiating element 300 of FIG. 4A.

Referring to FIG. 4A, the low-band radiating element 300 includes first and second feed stalks 310-1, 310-2. First and second dipole radiators 320-1, 320-2 (discussed below) are mounted on distal ends of the first and second feed stalks 310-1, 310-2. In the depicted embodiment, the radiating element 300 further includes a small cross-shaped printed circuit board 316 that is mounted at the distal (forward) end of the feed stalks 310-1, 310-2.

In the depicted embodiment, each feed stalk 310 is implemented using a printed circuit board that has an RF transmission line 312 formed thereon. A first of the feed stalks 310-1 may include a front slit and the second of the feed stalks 310-2 includes a back slit. These slits allow the two feed stalks 310 to be assembled together to form a forwardly extending column that has generally x-shaped vertical cross-sections. Rear portions of each feed stalk 310 may include projections that are inserted through slits in a feed board printed circuit board (not shown) to mount the radiating element 300 thereon. The RF transmission lines 312 carry RF signals between the feed board printed circuit board (not shown) and the dipole radiators 320. The RF transmission lines 312 on the respective feed stalks 310 center feed the dipole radiators 320-1, 320-2. While the feed stalks 310 are illustrated as being printed circuit board-based feed stalks, it will be appreciated that embodiments of the present invention are not limited thereto. In other embodiments, wire or sheet metal feed stalks, for example, may be used instead of the printed circuit board-based feed stalks 310.

The first dipole radiator 320-1 extends along a first axis and the second dipole radiator 320-2 extends along a second axis that is generally perpendicular to the first axis. The first dipole radiator 320-1 includes first and second dipole arms 330-1, 330-2, and the second dipole radiator 320-2 includes third and fourth dipole arms 330-3, 330-4. Dipole arms 330-1 and 330-2 are center fed by a first of the RF transmission lines 312 and radiate together at a first polarization. In the depicted embodiment, the first dipole radiator 320-1 is designed to transmit and receive signals having a slant +45° linear polarization. Dipole arms 330-3 and 330-4 of second dipole radiator 320-2 are center fed by a second of the RF transmission lines 312 and radiate together at a second polarization that is orthogonal to the first polarization. The second dipole radiator 320-2 is designed to transmit and receive signals having a slant −45° linear polarization. Thus, dipole radiators 320-1, 320-2 are implemented as a pair of center-fed slant −45°/+45° linear polarization dipole radiators 320. The dipole arms 330 may be mounted approximately 3/16 to 1/4 an operating wavelength forwardly of the reflector 214 by the feed stalks 310 in example embodiments.

Each dipole arm 330 may comprise a conductor such as a metal wire 332 that includes a first portion 334 that has a helix-shape. In the embodiment of FIG. 4A, the first portion 334 comprises substantially the entirety of each dipole arm 330 so that each dipole arm 330 comprises a metal wire 332 that is wound to have a helix-shape. In the depicted embodiment, the metal wire 332 is wound about an axis 336 in a helix that has a uniform magnitude M (i.e., the maximum extent of each turn 338 of the helix is the same and the turns have a uniform spacing S (one of the turns 338 is enclosed within the dotted box in FIG. 4A). In other words, the helix-shape is a true helix. In other embodiments, other helix-shapes may be used such as stepwise approximations of a helix. Each dipole arm 330 may have an electrical length that is between 0.2 to 0.35 of an operating wavelength, where the "operating wavelength" refers to the wavelength corresponding to a center frequency of the operating frequency band of the radiating element 300. In some embodiments, the electrical length of each dipole arm 330 may be about 1/4 the operating wavelength.

Referring again to FIGS. 2 and 3, it can be seen that the low-band radiating elements 224 (300) extend farther forwardly from the reflector 214 than do both the mid-band radiating elements 234 and the high-band radiating elements 244. In order to keep the width of the base station antenna 100 relatively narrow, the low-band radiating elements 224 (300) may be located in very close proximity to both the mid-band radiating elements 234 and the high-band radiating elements 244. In the depicted embodiment, each low-band radiating element 224 (300) that is adjacent a linear array 230 of mid-band radiating elements 234 may overlap a substantial portion of two of the mid-band radiating elements 234. Likewise, each low-band radiating element 224 (300) that is adjacent an array 240 of high-band radiating elements 244 may overlap at least a portion of one or more of the high-band radiating elements 244. This arrangement allows for a significant reduction in the width of the base station antenna 100. Herein, two radiating elements "overlap" if an axis that is perpendicular to a plane defined by the reflector on which the radiating elements are mounted passes through both radiating elements.

While positioning the low-band radiating elements 224 (300) so that they overlap the mid-band and/or the high-band radiating elements 234, 244 may advantageously facilitate reducing the width of the base station antenna 100, this approach may significantly increase the coupling of RF energy transmitted by the mid-band and/or the high-band radiating elements 234, 244 onto the low-band radiating elements 224 (300), and such coupling may result in scattering that degrades the antenna beams formed by the arrays 230, 240 of mid-band and/or high-band radiating elements 234, 244.

In order to reduce such coupling, the low-band radiating elements 300 may be designed to have dipole arms 330 that are substantially "transparent" to radiation emitted by either or both the mid-band radiating elements 234 and the high-band radiating elements 244. This may be challenging, as the mid-band radiating elements 234 may operate (in some cases) at frequencies as low as 1427 MHz and the high-band radiating elements 244 may operate (in some cases) at frequencies as high as 4200 MHz. Thus, ideally the low-band radiating elements 300 are substantially transparent to RF energy in the 1427-4200 MHz frequency range, while allowing currents in, for example, the 617-960 MHz frequency range to flow freely on the dipole arms 330. Herein, a dipole arm of a radiating element that is configured to transmit RF energy in a first frequency band is considered to be "transparent" to RF energy in a second, different, frequency band if the RF energy in the second frequency band poorly couples to the dipole arm. Accordingly, if a dipole arm of a first radiating element that is transparent to a second frequency band is positioned so that it overlaps a second radiating element that transmits in the second frequency band, the addition of the first radiating element will not materially impact the antenna pattern of the second radiating element.

FIG. 4B is a side view of a portion of one of the dipole arms 330 of radiating element 300. The arrows that are superimposed along the dipole arm 330 illustrate the direction of the currents that are induced on dipole arm 330 when a nearby mid-band radiating element 234 transmits RF energy. As shown in FIG. 4B, currents are induced on dipole arm 330 that flow in opposite directions along the dipole arm 330. These currents, consequently, tend to cancel each other out, thereby reducing or substantially eliminating scattering of the mid-band RF radiation by the low-band dipole arms 330.

Figure 4C:
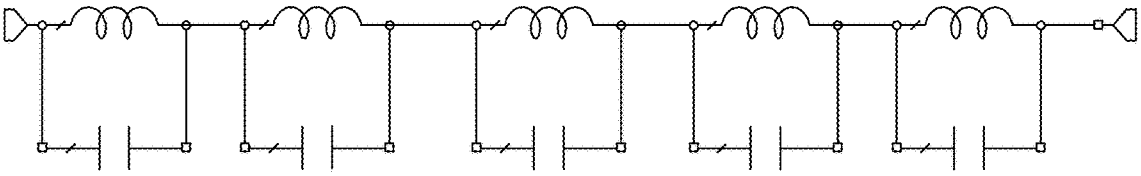
FIG. 4C is a circuit diagram of the dipole arm of FIG. 4B.

FIG. 4C is an equivalent circuit diagram of a helix-shaped dipole arm that includes five turns. As shown in FIG. 4C, each turn of the helix-shape comprises a parallel L-C circuit, and these parallel L-C circuits are electrically connected to each other in series. Each dipole arm 330 will have the equivalent circuit shown in FIG. 4C, except that the equivalent circuit will include ten parallel L-C circuits in series, as each dipole arm 330 has ten turns 338. The capacitance values in the equivalent circuit of FIG. 4C may be adjusted, for example, by changing the diameter of the metal wire 332, the spacing S between turns 338, or the magnitude M of the helix-shape. The inductance values in the equivalent circuit of FIG. 4C may be adjusted, for example, by changing the diameter of the metal wire 332. The capacitance and inductance values in the equivalent circuit of FIG. 4C may be set so that the dipole arm 330 acts like a band-pass or low-pass filter that passes RF currents in the low-band operating frequency range while suppressing RF currents in the mid-band operating frequency range. In this way, the dipole arms 330 may operate normally when fed with low-band RF signals, but may suppress scattering of RF energy emitted by nearby mid-band radiating elements.

Figure 4D:
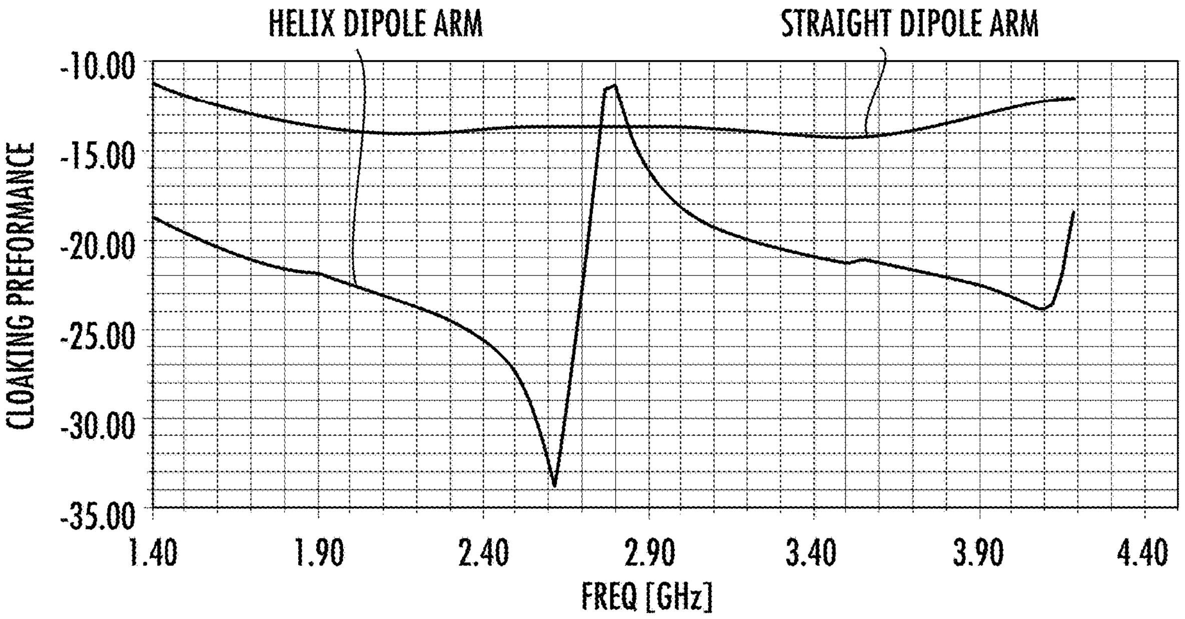
FIG. 4D is a graph illustrating the simulated cloaking performance of the low-band radiating element of FIG. 4A as compared to a low-band radiating element having non-cloaked dipole arms.

FIG. 4D is a graph that illustrates, as a function of frequency, the radar cross-section of a low-band dipole arm that is formed as a straight metal wire as compared to a low-band dipole according to embodiments of the present invention that is implemented as a metal wire having a helix-shape. The radar cross-section is a performance parameter relating to the extent that a lower-band radiating element will scatter higher-band RF energy. As shown in FIG. 4D, the straight low-band dipole arm has a relatively constant radar cross-section of about −11 dB to −14 dB across both the 1427-2690 MHZ mid-band operating frequency band and across the 3100-4200 MHz high-band operating frequency range. In sharp contrast, the helix-shaped dipole arm according to embodiments of the present invention has a radar cross-section of between −19 dB and −34 dB in the 1427-2690 MHZ mid-band operating frequency band and a radar cross-section of between −18 dB and −24 dB in the 3100-4200 MHz high-band operating frequency range.

As noted above, each radiating element 224 in the base station antenna 100 of FIGS. 1-3 may be implemented as radiating element 300 of FIG. 4A. As described above, base station antenna 100 has a first RF port 140 that is coupled to the first polarization radiator (e.g., the +45° polarization dipole radiator 320-1) of each of the low-band radiating elements 224/300 in a low-band array 220-1. Each of the low-band radiating elements 224/300 in the low-band array 220-1 is configured to transmit and receive RF signals in a first operating frequency band such as, for example, the 617-960 MHz frequency band or the 696-960 MHz frequency band. The base station antenna 100 further includes a second RF port 140 that is coupled to the first polarization radiator (e.g., the +45° polarization dipole radiator) of each of a plurality of mid-band radiating elements 234 that form a mid-band array 230-1. Each of the mid-band radiating elements 234 in the mid-band array 230-1 are configured to transmit and receive RF signals in a second operating frequency band, such as, for example, the 1427-2690 MHz frequency band or the 1695-2690 MHz frequency band. The second operating frequency band is at higher frequencies than the first operating frequency band. As described above, each of the low-band radiating elements 224/300 includes dipole radiators 320 that have center-fed first dipole arms 330, where each dipole arm 330 comprises a first conductor (namely metal wire 332), and where at least a first portion of the first conductor 332 has a helix-shape.

Each helix-shaped dipole arm 330 may comprise a plurality of resonant circuits such as a plurality of parallel L-C resonant circuits that are electrically coupled together in series, as shown in FIG. 4C. These resonant circuits may be configured to suppress formation of currents on the dipole arms 330 in a predetermined frequency range such as, for example, the operating frequency range of the second array 230-1. Physical characteristics of the dipole arms 330 such as the diameter and/or electrical length of the portion(s) of the metal wire 332 that form the helix and/or the magnitude M and/or spacing S of the turns of the helix may be selected to suppress formation of currents on the first dipole arm 330 in the predetermined frequency range. As described above, each of the dipole arms 330-1 through 330-4 of each of the radiating elements 224/300 that form the low-band array 220-1 may comprise a metal wire 332 (or other conductor) that has at least a first portion that has a helix-shape. Each of these dipole arms 330 may be center-fed.

As FIG. 4A also makes clear, cross-dipole radiating element 300 comprises a first dipole radiator 320-1 that comprises center-fed first and second dipole arms 330-1, 330-2 and a second dipole radiator 320-2 that comprises center-fed third and fourth dipole arms 330-3, 330-4. Each of the first through fourth dipole arms 330-1 through 330-4 comprises a respective first through fourth conductor 332, where each of the first through fourth conductors 332 has at least a first portion that has a helix-shape. The first through fourth dipole arms 330-1 through 330-4 are configured to suppress formation of currents thereon in a predetermined frequency range such as the frequencies within the operating frequency range band of one or more nearby arrays of radiating elements that operate in higher frequency bands, such as the mid-band and/or high-band arrays 230, 240 in base station antenna 100.

Figure 5A:
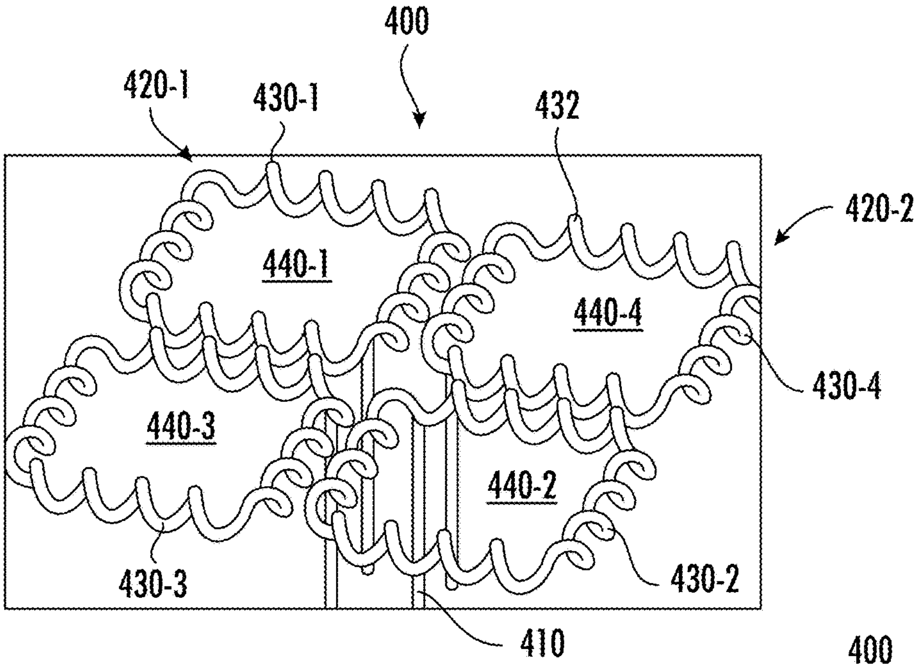
FIG. 5A is a schematic perspective view of a low-band radiating element according to further embodiments of the present invention.
Figure 5B:
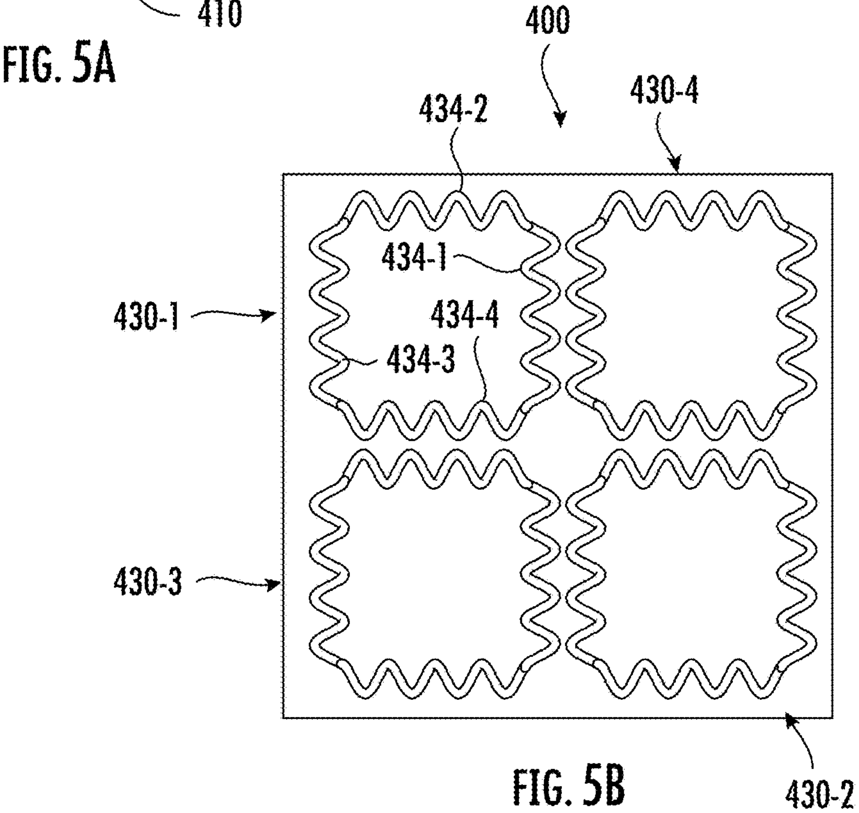
FIG. 5B is a schematic front view of the low-band radiating element of FIG. 5A.
Figure 5C:
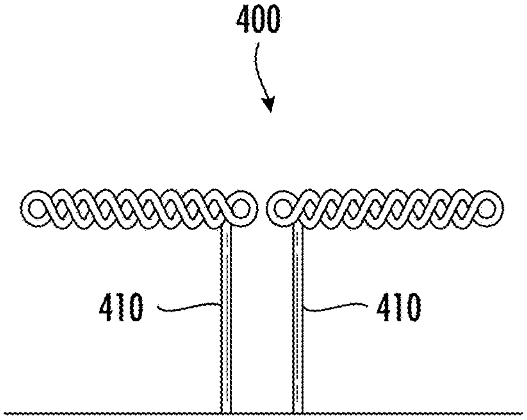
FIG. 5C is a schematic side view of the low-band radiating element of FIG. 5A.

FIGS. 5A-5C illustrate a low-band radiating element 400 according to further embodiments of the present invention. In particular, FIG. 5A is a schematic perspective view of the low-band radiating element 400, FIG. 5B is a schematic front view of the low-band radiating element 400, and FIG. 5C is a schematic side view of the low-band radiating element 400.

As shown in FIGS. 5A-5C, the low-band radiating element 400 is similar to low-band radiating element 300, but the dipole arms 430-1 through 430-4 of radiating element 400 are formed as respective conductive loops 440-1 through 440-4. The conductive loops 440 may be closed or open at their distal ends (i.e., the end of each loop 440 farthest from the feed stalks 410). In the depicted embodiment, each dipole arm 430 comprises four segments 434-1 through 434-4 or "portions", where each segment/portion 434 is formed as a metal wire 432 having a helix-shape. A single metal wire 432 may be used to form all four segments 434 in some embodiments, whereas multiple metal wires 432 (e.g., two) may be used to form the four segments 434 in other embodiments. The four segments 434 may, for example, be arranged at 90° angles with respect to each other so that each dipole arm 430 has a square shape. The four dipole arms 430 may together define a larger square as shown.

While not shown in the figures, in some embodiments, a high dielectric constant material may be inserted within the helix defined by each dipole arm 330, 430. The addition of such a high dielectric constant material may increase the coupling levels, which may allow a wider response range for the filter formed by each dipole arm 330, 430. Additionally, the high dielectric constant material may increase the electrical length of the metal wires 332, 432, and hence may allow shortening the physical length of the dipole arms 330, 430. This is advantageous, as it reduces the overall size of the radiating elements 300, 400. The high dielectric constant dielectric material may comprise, for example, a cylinder of high dielectric constant dielectric material.

While FIGS. 5A-5C illustrate a radiating element 400 that has dipole arms 430 that have four portions, each of which has a helix-shape, that define respective square conductive loops 440, it will be appreciated that embodiments of the present invention are not limited thereto. For example, in other embodiments, the dipole arms 430 may define ovals, circles or other regular or irregular loop shapes. Likewise, the four segments 434 may intersect at angles of other than 90° such as any oblique angle.

In the embodiment of FIGS. 5A-5C, an end of each dipole arm 430 may extend rearwardly to form a feed stalk 410 for the dipole arm 430. It will be appreciated however, that any appropriate feed stalk structure may be used to form radiating element 400.

While each dipole arm 330, 430 in radiating elements 300, 400 is formed using a single metal wire 332, 432 that has one or more helix shapes defined therein, it will be appreciated that embodiments of the present invention are not limited thereto. For example, FIGS. 6A and 6B illustrate dipole arms according to embodiments of the present invention that may be used in radiating element 300 of FIG. 4A in place of the dipole arms 330 shown therein.

Figure 6A:
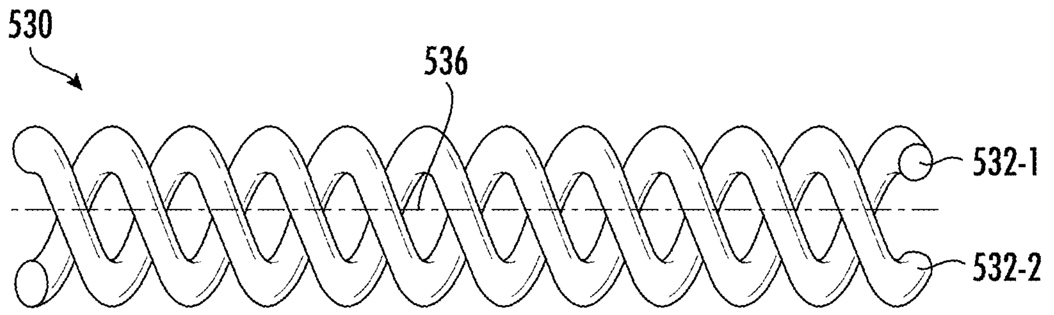
FIGS. 6A and 6B are schematic side views of dipole arms according to further embodiments of the present invention.

Referring first to FIG. 6A, a dipole arm 530 is shown that comprises first and second metal wires 532-1, 532-2 that each have a helix-shape. The first and second metal wires 532-1, 532-2 are wound around a common axis 536. Both the first and second metal wires 532-1, 532-2 may be galvanically connected to a feed stalk of the radiating element that includes dipole arm 530 in some embodiments. In the depicted embodiment, the entirety of each metal wire 532-1, 532-2 is formed to have a helix shape, but it will be appreciated that embodiments of the present invention are not limited thereto. For example, each metal wire 532 may alternatively be formed in the manner shown in FIG. 7 (see discussion below) in other embodiments. By providing a dipole arm 530 that includes two helix-shaped metal wires 532-1, 532-2 that are wound about the common axis 536, the amount of inductive and capacitive coupling can be increased, which may be used to refine the response of the filter formed in dipole arm 530.

Figure 6B:
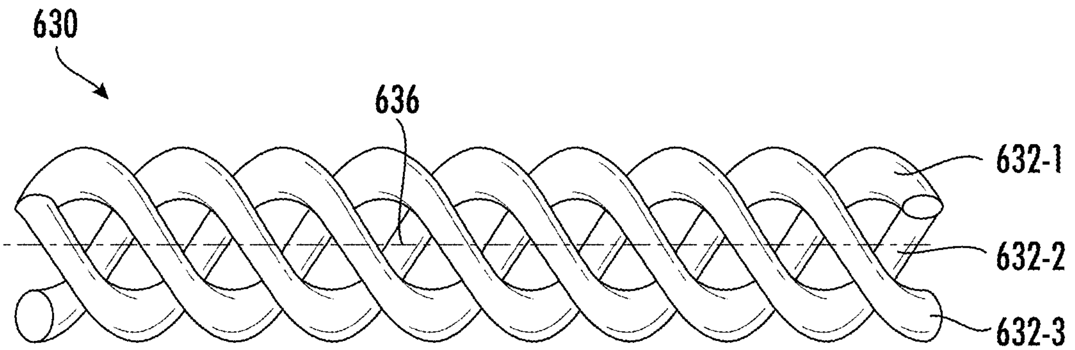

Referring next to FIG. 6B, a dipole arm 630 is shown that comprises first through third metal wires 632-1, 632-2, 632-3 that each have a helix-shape and that are wound around a common axis 636. All three metal wires 632-1, 632-2, 632-3 may be galvanically connected to a feed stalk of the radiating element that includes dipole arm 630.

Figure 7:
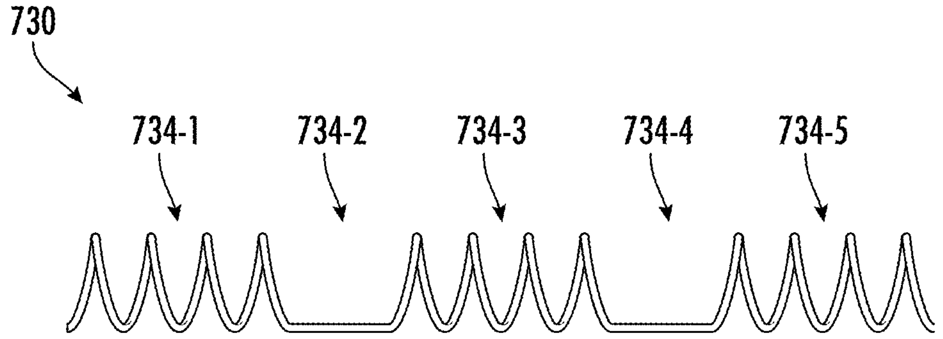
FIG. 7 is a schematic perspective view of a dipole arm having helix-shaped portions according to further embodiments of the present invention.

FIG. 7 is a schematic perspective view of a helix-shaped dipole arm 730 according to further embodiments of the present invention. As can be seen, the dipole arm 730 is similar to the dipole arms 330 of the radiating element 300 of FIG. 4A, except that dipole arm 730 includes a total of five segments 734-1 through 734-5 that are physically and electrically connected to each other. Segments 734-1, 734-3 and 734-5 each have a helix-shape, whereas segments 734-2 and 734-4 have non-helix-shapes (here they are straight segments 734). In the illustrated embodiment, the segments 734-1, 734-3 and 734-5 that each have the helix-shape are collinear with each other. FIG. 7 illustrates that the entirety of the dipole arms of the radiating elements according to embodiments of the present invention do not need to have a helix-shape. Instead, one or more portions of the dipole arm that include less than all of the dipole arm may have a helix-shape in some embodiments.

Pursuant to further embodiments of the present invention, other elements of a base station antenna may include one or more portions that have a helix shape in order to render those portions of the elements substantially (or at least more) transparent to RF energy in a predetermined frequency range. Physical parameters of these elements and the characteristics (e.g., magnitude M, spacing S between turns) of the helix may be selected in the manner described above in order to render the elements substantially transparent to RF energy in the predetermined frequency range.

For example, FIG. 5A is a perspective view of a coaxial cable 800 that is wound in a helix according to further embodiments of the present invention. In many cases, coaxial cables are used to feed the radiating elements of a base station antenna, either directly or by connecting to feed board printed circuit boards for the radiating elements. Because of this, RF energy emitted by the radiating elements of other linear arrays may be incident on the coaxial cables. If the coaxial cable segments are of a resonant length, the RF energy emitted by the radiating elements of the other linear arrays may form currents on the outer conductors of the coaxial cables which re-radiate the RF energy, resulting in disturbance of the radiation patterns of the other linear arrays, which may be undesirable.

As discussed above, when a metal element—such as coaxial cable 800—is wound to have one or more portions having a helix-shape, a resonant circuit may be created that acts to suppress formation of RF currents in a predetermined frequency range on the metal element. Thus, the same technique used on the dipole arms discussed above may be applied to coaxial cables in order to render the coaxial cables substantially transparent to RF energy in a predetermined frequency range.

Figure 8A:
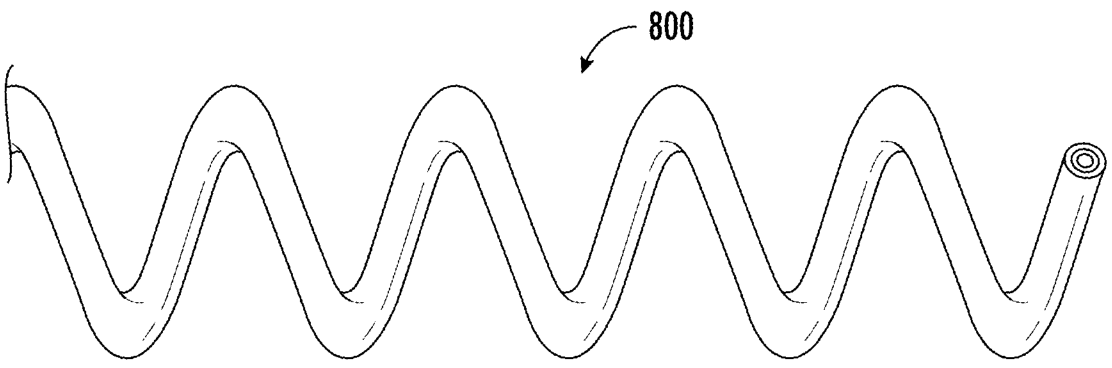
FIG. 8A is a perspective view of a helical coaxial cable according to embodiments of the present invention.
Figure 8B:
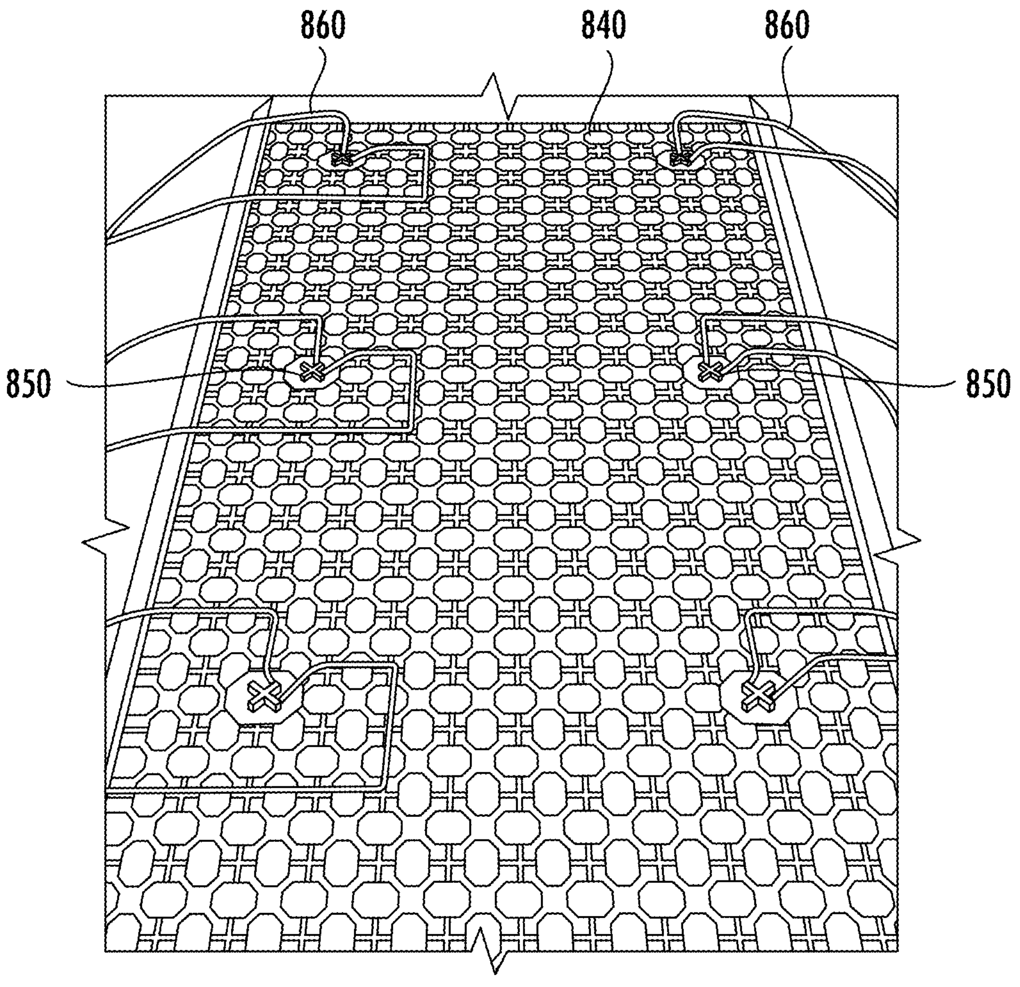
FIG. 8B is a perspective view of a frequency selective surface having helical coaxial cables mounted thereon.

FIG. 8B illustrates one application in which the coaxial cable 800 may be employed. As described, for example, in U.S. Pat. No. 11,482,774 ("the '774 patent"), issued Oct. 25, 2022, the entire content of which is incorporated herein by reference, base station antennas are being developed that include a passive base station antenna that has an active antenna module mounted on a rear surface thereof. The active antenna module may include a multi-column array of high-band radiating elements. Radiating elements of the arrays in the passive base station antenna (e.g., low-band or mid-band arrays) may be mounted in front of the multi-column array of radiating elements that is included in the active antenna module. In some cases, a frequency selective surface may be positioned in front of the multi-column array of radiating elements and behind the radiating elements of the arrays in the passive base station antenna that are mounted in front of the multi-column array of radiating elements. The frequency selective surface may comprise, for example, a metallization pattern on a printed circuit board or sheet metal that has been stamped to form a metallization pattern. The metallization pattern may comprise a large number of unit cells, where each unit cell comprises a sub-wavelength structure that forms a resonant circuit. The unit cells may form a "spatial filter" that may be designed to substantially reflect RF energy in the operating frequency band of at least one of the arrays in the passive antenna, and to be substantially transparent to RF energy in the operating frequency band of the multi-column array of radiating elements.

As shown in FIG. 8B, a frequency selective surface 840 is provided is positioned. As explained in the above-referenced '774 patent, the frequency selective surface 840 may be positioned forwardly of a multi-column array of higher-band radiating elements, and behind one or more arrays of lower-band radiating elements. The multi-column array of higher-band radiating elements (of the active antenna module) and the arrays of lower-band radiating elements (of the passive base station antenna) are omitted in FIG. 8B to simplify the drawing. As shown in FIG. 8B, feed board printed circuit boards 850 for the radiating elements of the lower-band arrays in the passive base station antenna may be mounted on the frequency selective surface 840. Coaxial cables 860 may be routed along the frequency selective surface 840. These coaxial cables 860 are used to pass RF signals between the feed board printed circuit boards 850 and other components of the feed networks for the arrays in the passive base station antenna. Unfortunately, the coaxial cables 860 can scatter RF energy that is emitted by the multi-column array of radiating elements of the active antenna module. Portions of the coaxial cables 860 that extend in front of the multi-column array of radiating elements may thus be implemented using the coaxial cables 800 that have portions that have a helix-shape. This may reduce the impact that the coaxial cables 800 have on the antenna beams generated by the multi-column array of radiating elements.

Base station antennas also often include so-called "parasitic elements" that are used to shape the antenna beams formed by one or more of the arrays of radiating elements included in the base station antenna. These parasitic elements often are designed to have an electrical length of about one half a wavelength of the center frequency of the operating frequency band of an array of radiating elements for which the parasitic element is designed to shape the antenna beams. Unfortunately, if a parasitic element has an electrical length of about one half a wavelength of the center frequency of a first array (e.g., a low-band array) then it may have an electrical length of about one wavelength of the center frequency of a second array (e.g., a mid-band array), and hence the parasitic element can also end up shaping the antenna beams generated by the second array. In practice it can be difficult to identify positions for such parasitic elements where they improve the shape of the antenna beams for both arrays.

Figure 9A:
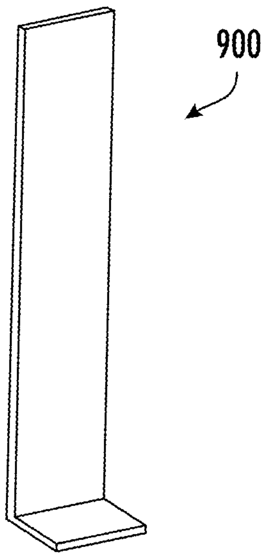
FIG. 9A is a perspective view of a conventional reflector-mounted parasitic element.

FIG. 9A is a schematic perspective view of a conventional parasitic element 900 that can be mounted, for example, to extend forwardly from a reflector of a base station antenna. This conventional parasitic element 900 is not "cloaked" and hence may shape the antenna beams generated by, for example, both nearby low-band arrays and near-by mid-band arrays.

Figure 9B:
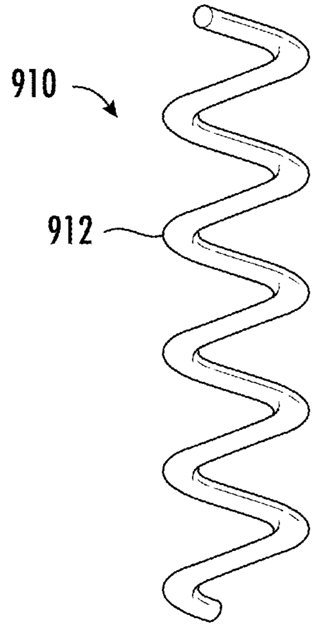
FIG. 9B is a perspective view of a reflector-mounted parasitic element according to embodiments of the present invention.

FIG. 9B is a schematic perspective view of a parasitic element 910 according to embodiments of the present invention that can likewise be mounted, for example, to extend forwardly from a reflector of a base station antenna. The parasitic element 910 comprises a metal wire 912 that has at least one portion that has a helix-shape. The parasitic element 910 may be configured to shape the antenna beams generated by a nearby lower frequency band array of radiating elements while being substantially transparent to RF energy emitted by at least one higher frequency band array of radiating elements. The same techniques, discussed above, that are used to design the dipole arms 330 of radiating element 300 may be used to design the parasitic element 910 so that it will be cloaking in the higher frequency band.

As discussed above with respect to FIG. 8B, some base station antennas include frequency selective surfaces that act as a reflective surface in a first frequency range and that appear substantially transparent to RF energy in a second frequency range. As described in more detail in the above-referenced '774 patent, these frequency selective surfaces may be formed using a plurality of sub-wavelength (e.g., less than a tenth of a wavelength) unit cell structures.

Figure 10:
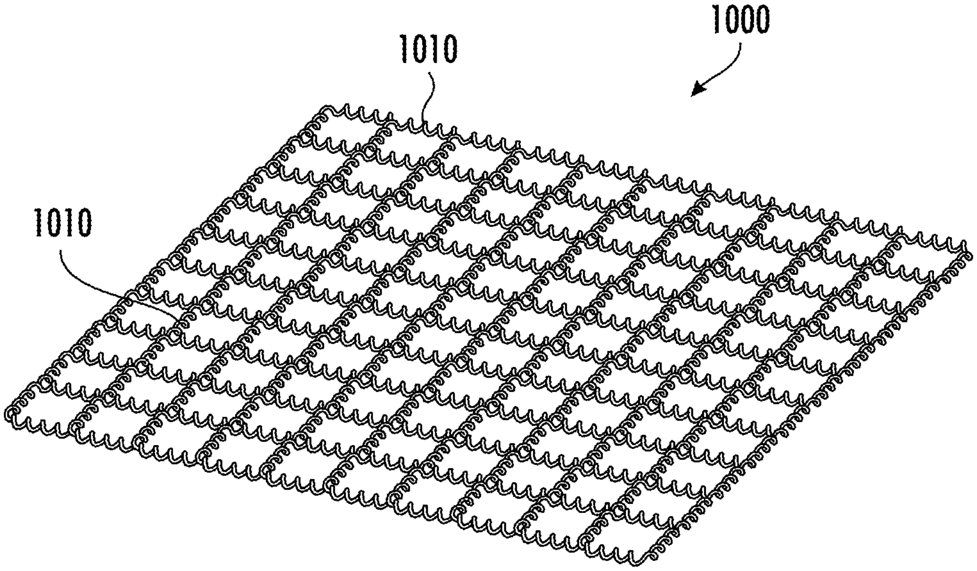
FIG. 10 is a perspective view of a frequency selective surface according to embodiments of the present invention.

Pursuant to further embodiments of the present invention, frequency selective surfaces are provided that are formed as a two dimensional grid of wires that have at least portions that are formed to have a helix-shape. FIG. 10 is a schematic perspective view of one such frequency selective surface 1000. In this particular embodiment, the frequency selective surface 1000 may be formed by winding a plurality of metal wires 1010 to have helix-shapes, and then arranging the wires 1010 to define a grid. The wires 1010 may be soldered together (or otherwise galvanically or capacitively coupled together) at locations where the wires 1010 cross. As described above, the helix-shaped portions of each wire 1010 form resonant L-C circuits, and these resonant L-C circuits may be configured to form a spatial filter that acts as a reflective surface in a first frequency range and that appears substantially transparent to RF energy in a second frequency range.

The radiating elements according to embodiments of the present invention may provide a number of advantages. As noted above, the dipole arms may exhibit reduced scattering with respect to RF energy in the operating frequency band of higher frequency radiating elements. In some embodiments, the dipole arms may be cloaked in at least two frequency bands (e.g., across both the mid-band frequency range and the high-band frequency range). Moreover, the dipole arms may be formed by simply bending metal wires and hence may have low material and manufacturing costs.

Embodiments of the present invention have been described above with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "on" another element, it can be directly on the other element or intervening elements may also be present. In contrast, when an element is referred to as being "directly on" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between", "adjacent" versus "directly adjacent", etc.).

Relative terms such as "below" or "above" or "upper" or "lower" or "horizontal" or "vertical" may be used herein to describe a relationship of one element, layer or region to another element, layer or region as illustrated in the figures. It will be understood that these terms are intended to encompass different orientations of the device in addition to the orientation depicted in the figures.

Herein, the term "substantially" means within +/−10%.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, operations, elements, and/or components, but do not preclude the presence or addition of one or more other features, operations, elements, components, and/or groups thereof.

Aspects and elements of all of the embodiments disclosed above can be combined in any way and/or combination with aspects or elements of other embodiments to provide a plurality of additional embodiments.

That which is claimed is:

1. A base station antenna, comprising:

a first radio frequency ("RF") port;

a first array of radiating elements that are configured to transmit and receive RF signals in a first operating frequency band, where each of the radiating elements in the first array is coupled to the first RF port;

a second RF port; and a second array of radiating elements that are configured to transmit and receive RF signals in a second operating frequency band, where each of the radiating elements in the second array is coupled to the second RF port, and the second operating frequency band is at higher frequencies than the first operating frequency band, wherein a first of the radiating elements in the first array includes a feed stalk, a printed circuit board that is mounted on the feed stalk, and a first dipole radiator that has a center-fed first dipole arm that comprises a first conductor, where at least a first portion of the first conductor has a helix-shape;

wherein the first dipole arm comprises a metal wire that extends from the printed circuit board.

2. The base station antenna of claim 1, wherein the first portion of the first conductor comprises at least two resonant circuits that, together or in combination with additional resonant circuits, are configured to suppress formation of currents in the second operating frequency band on the first dipole arm.

3. The base station antenna of claim 1, wherein a diameter or electrical length of the first portion of the first conductor or a magnitude or spacing of turns of the helix defined by the first portion of the first conductor is selected to suppress formation of currents in the second operating frequency band on the first dipole arm.

4. The base station antenna of claim 1, wherein the first dipole arm further comprises a second conductor, wherein at least a first portion of the second conductor has a helix-shape, and wherein the first portions of the first and second conductors are wound around a common axis.

5. The base station antenna of claim 1, wherein the first conductor further includes a second portion that has a helix-shape.

6. The base station antenna of claim 5, wherein the first portion is collinear with the second portion and spaced apart from the second portion by a third portion of the first conductor that does not have a helix-shape.

7. The base station antenna of claim 5, wherein the first conductor forms a conductive loop.

8. The base station antenna of claim 7, wherein the first portion of the first conductor and one or more additional portions of the first conductor that are part of the conductive loop each have a helix-shape.

9. The base station antenna of claim 1, wherein the first dipole radiator further includes a center-fed second dipole arm that comprises a second conductor, where at least a first portion of the second conductor has a helix-shape.

10. The base station antenna of claim 1, wherein a diameter or electrical length of the first portion of the first conductor or a magnitude or spacing of turns of the helix defined by the first portion of the first conductor is selected to suppress formation of currents in the second operating frequency band on the first dipole arm.

* * * * *